United States Patent
Persico et al.

(10) Patent No.: US 11,667,399 B2
(45) Date of Patent: Jun. 6, 2023

(54) DECK LANDING SYSTEM FOR AIRCRAFTS

(71) Applicant: MAGNAGHI AERONAUTICA S.p.A., Naples (IT)

(72) Inventors: Pietro Persico, Naples (IT); Pierluigi Manzo, Naples (IT)

(73) Assignee: MAGNAGHI AERONAUTICA S.P.A., Naples (IT)

( * ) Notice: Subject to any disclaimer, the term of this patent is extended or adjusted under 35 U.S.C. 154(b) by 313 days.

(21) Appl. No.: 16/758,530

(22) PCT Filed: Oct. 26, 2018

(86) PCT No.: PCT/EP2018/079390
§ 371 (c)(1),
(2) Date: Apr. 23, 2020

(87) PCT Pub. No.: WO2019/081697
PCT Pub. Date: May 2, 2019

(65) Prior Publication Data
US 2020/0255161 A1    Aug. 13, 2020

(30) Foreign Application Priority Data
Oct. 27, 2017   (IT) .................. 102017000122705

(51) Int. Cl.
B64F 1/02    (2006.01)
B64F 1/12    (2006.01)
B64U 70/30   (2023.01)

(52) U.S. Cl.
CPC ............ *B64F 1/0297* (2020.01); *B64F 1/125* (2013.01); *B64U 70/30* (2023.01)

(58) Field of Classification Search
None
See application file for complete search history.

(56) References Cited

U.S. PATENT DOCUMENTS 3,151,826 A    10/1964   Victor
2012/0068013 A1   3/2012   Affre De Saint Rome

FOREIGN PATENT DOCUMENTS

ES    2425019 A1   10/2013
WO    9104910 A1   4/1991
WO    2010112717 A1   10/2010

*Primary Examiner* — Reginald S Tillman, Jr.
(74) *Attorney, Agent, or Firm* — Volpe Koenig

(57) ABSTRACT

A deck landing system for aircrafts, in particular rotating wing aircrafts, apt to implement a hook between the aircraft and the deck of a ship or of a floating platform, the deck being equipped with a target grid plate, it does not require the use of hydraulic systems and it comprises: a telescopic actuator (1) with a harpoon (3) having, at its own distal end, hooking grippers (7); and a control unit (9) which actuates said telescopic actuator (1), wherein the telescopic actuator (1) comprises a linear electromechanical actuator (8) having: a main battery (13) fed through a unit (12) for converting and conditioning the energy and connected to said telescopic actuator (1); and a device (10) for recovering and releasing the kinetic energy generated by the waves with the aircraft locked on said deck, is of the type acting with supercapacitors, which feeds said main battery (13).

6 Claims, 3 Drawing Sheets

*FCS: Flight Control System
**FBW: Fly-By-Wire

DECK LANDING SYSTEM FOR AIRCRAFTS

The present invention relates to an electromechanically actuated modular deck landing system, integrated with a system for recovering and re-using the kinetic energy, capable of securing an aircraft to the deck of a shift, even by absorbing adequately the energy developed by the possible wave motion of the sea.

This system generally is applied to helicopters with crew, but it can also be used by aircrafts without crew (UAV) ("Unmanned Aerial Vehicle") or by other types of vehicles, such as for example aircrafts capable of being operated according to VTOL (Vertical Take Off and Landing) or VSTOL (Vertical or Short Take Off and Landing) functionalities.

The known systems allow the helicopters acting from military ships, where the deck is equipped with particular grid plates in compliance with standards such as for example STANAG 1276 (Shipborne Helicopter and UAV Harpoon-Grid Rapid Securing System), to safely lock the vehicle to the deck, even under conditions of heavy sea, without the assistance of shipboard personnel. In a nutshell, it consists of a harpoon, extending from the aircraft in the direction of a metal grid plate on the ship deck. The harpoon consists of a rod having a distal end which comprises a mechanism with hinged gripper which is capable to fix and connect with the grid plate elements on the deck. Harpoon and grid plate thus implement a mechanical connection which is exploited by applying a pulling tension to the harpoon rod, by securing the aircraft to the deck.

A system of hydraulic type is described with reference to the enclosed FIG. 1, as reference to the state of art.

Generally, the operation of the system onboard the aircraft is based upon a hydro-mechanical technology and it uses an extending and retracting telescopic hydraulic actuator 1 which drives the rod 2 of the harpoon 3, a high-pressure accumulator 4, a manual unlocking device 5 and a hydraulic control unit 6.

Such system is then actuated firstly through the hydraulic power provided by the hydraulic system onboard the helicopter and it is controlled directly by the pilot in the cabin during the deck landing procedure. A secondary actuating/extending sub-system allows, still with a direct command of the pilot, to try at least two emergency extensions, in case of failure of the onboard primary hydraulic system.

The extending and retracting actuator 1 of the deck landing system with the grippers 7 hooking to the grid plate of the ship represents the main operating component and the most complex portion in terms of interface with the same aircraft, both for aspects of mechanical installation thereon, which has to guarantee the correct functional distances between the fuselage, the ship deck and the system itself, both to guarantee the required functional performances which have to secure a durable hook to the deck under all conditions provided by specification, and heavy sea in particular.

It is fed by a high-pressure accumulator 4 which allows to meet the operating performances required by the coupled use ship/helicopter in performing the maritime missions, by carrying out the following functions of:

providing a static tensional load to the harpoon 3 in order to keep the helicopter locked safely to the deck of the ship when the hydraulic system of the vehicle is not operative, for a prolonged duration, generally of at least three hours, by absorbing the holding loads of the helicopter locked on the deck, by dampening them suitably;

dampening suitably the increases in hydraulic pressure generated by the related motion between ship and helicopter through the variation in volume inside thereof, in the step of Ship Motion, generally obtained with the interaction of two accumulators integrated in one for optimizing weight, spaces and costs;

allowing a procedure of emergency hooking of the deck landing system in case of failure of the hydraulic system of the aircraft; and allowing at least two hooking procedures, in case the first one fails, under emergency conditions.

The deck landing system further comprises a hydraulic control unit 6, which is the heart of the deck landing system, which supervises the hooking, unlocking, controlling and surveying procedures of the system with the following main functions of:

sending to the actuator 1 of the harpoon 3 the hydraulic commands electrically received by the pilots in cabin;

controlling the correct operation of the deck landing system, by highlighting possible malfunctions in cabin;

providing and controlling a hydraulic pressure to the extending, retracting and unlocking lines of the harpoon 3 and of the grippers 7; and keeping the pressure value of the supply line below the acceptable one for the correct system operation.

At last, the deck landing system comprises a manual unlocking device 5 allowing to unlock the grippers of the harpoon in a natural way, both in case of failure of the onboard hydraulic system and in case of maintenance procedures.

Such manual unlocking device substantially is a manual pump, which provides the necessary pressure to the gripper group 7 of the harpoon 3 to unlock the plunger which keeps them in the locked position.

An example of locking gripper and harpoon for aircrafts is described in the Spanish patent application N. ES 2,425, 019 A1.

The growing International market of the deck landing systems, however, is constituted by new rotating wing aircrafts, with or without crew, which use more and more the electric power instead of hydraulic power, by making inadequate this generation of deck landing systems.

The technical problem underlying the present invention is to provide a deck landing system allowing to obviate the drawback mentioned with reference to the known art.

Such problem is solved by a system as specified above, wherein the telescopic hydraulic actuator comprises a linear electromechanical actuator driven and controlled by an electronic control unit, replacing the hydraulic control unit, which manages even a device for recovering and releasing the kinetic energy developed by the sea waves with helicopter locked on the ship deck, replacing the high-pressure accumulator.

This system allows to unlock the grippers of the electromechanical actuator manually both in case of failure of the onboard primary electric system, and in case of maintenance procedures of the helicopter and/or of the Deck Lock system.

The system is further equipped with an electric motor supplied by an auxiliary battery of the aircraft, dedicated to the purpose, and it provides the power required to the gripper group of the actuator to unlock the mechanism which keeps them in the closed position.

This system then combines the electro-mechanical actuation technology, by now widely used on fixed or rotating wing vehicles, with the technologies of the super-capacitors and of the systems for recovering and releasing the kinetic energy (KERS). This integration makes the deck landing system capable of accumulating and then recovering an exceptionally big amount of electric charge, to return it instantaneously upon need, by allowing to perform the functions of the deck landing system.

The system is further suitable to be used on helicopters even of different class in a determined range of maximum weight at the time of taking-off (MTOW—Maximum Take-Off Weight) comprised between 5000 and 15000 kg, with the purpose of having one single product, which can be adapted, with few modifications of mechanical interface and electric power, to the helicopter whereon it will have to be installed.

It is further to be noted that the electric actuation has a greater reliability and fewer management and maintenance costs.

The present invention will be described hereinafter according to a preferred embodiment example thereof, provided by way of example and not for limitative purposes with reference to the enclosed drawings wherein.

Figure 1:
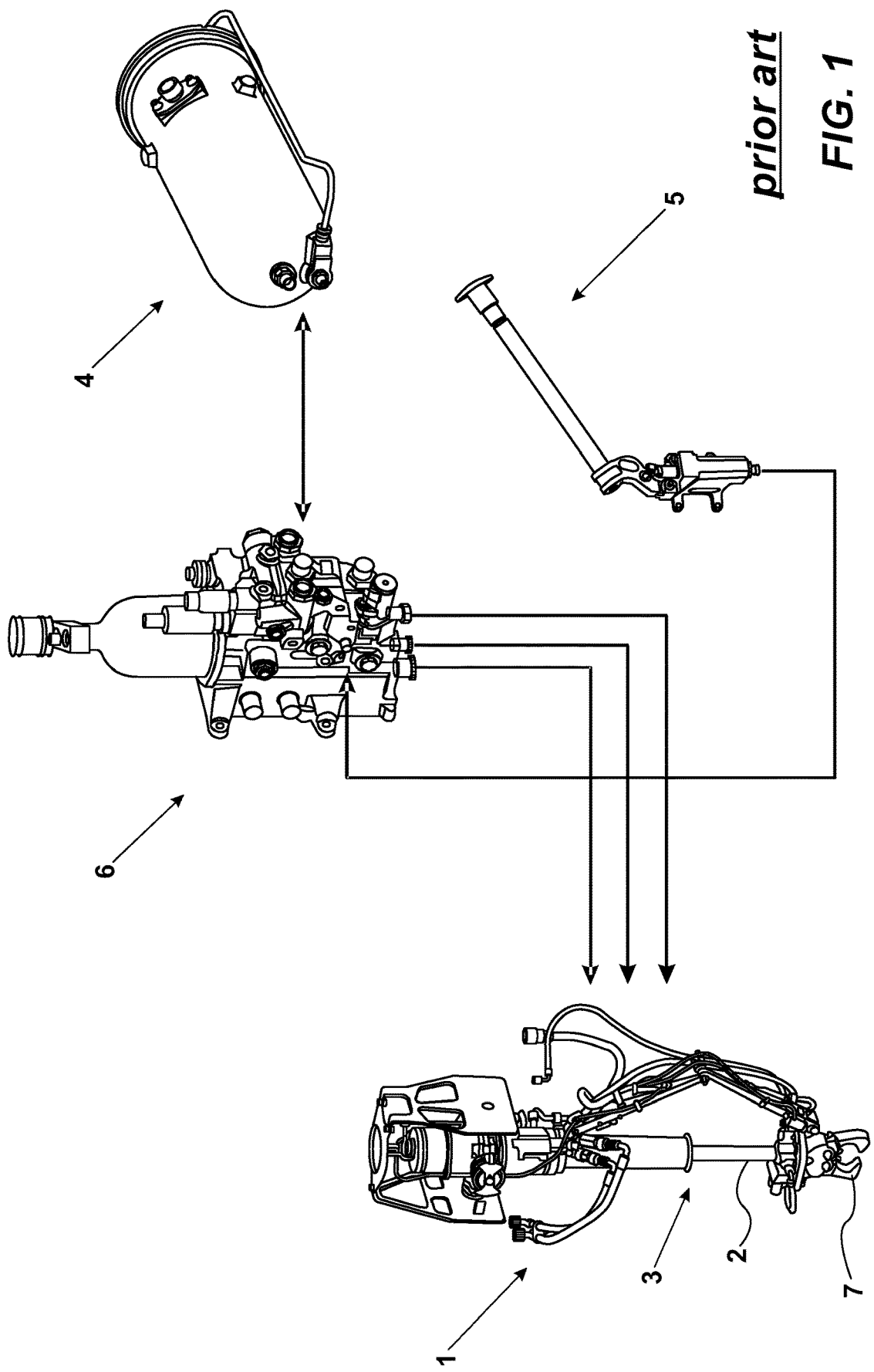
FIG. 1 shows a scheme illustrating a deck landing system according to the prior art.

With reference to figures, the herein described deck landing system, intended to be assembled on a rotating wing aircraft, comprises an extension and retraction telescopic actuator 1 which drives a rod 2 of a harpoon 3 having, at the proximal end thereof, hooking grippers 7.

The telescopic actuator 1 comprises a linear electromechanical actuator 8 which actuates said rod 2 and which is driven and controlled by an electronic control unit 9.

The electro-mechanical actuator 8 is of the linear type and it can be adapted from the electric point of view with motor power adjustment and even from the point of view of the outer mechanical interface towards the helicopter, by modifying some geometrical parameters, so as to have a highly versatile equipment.

Figure 3:
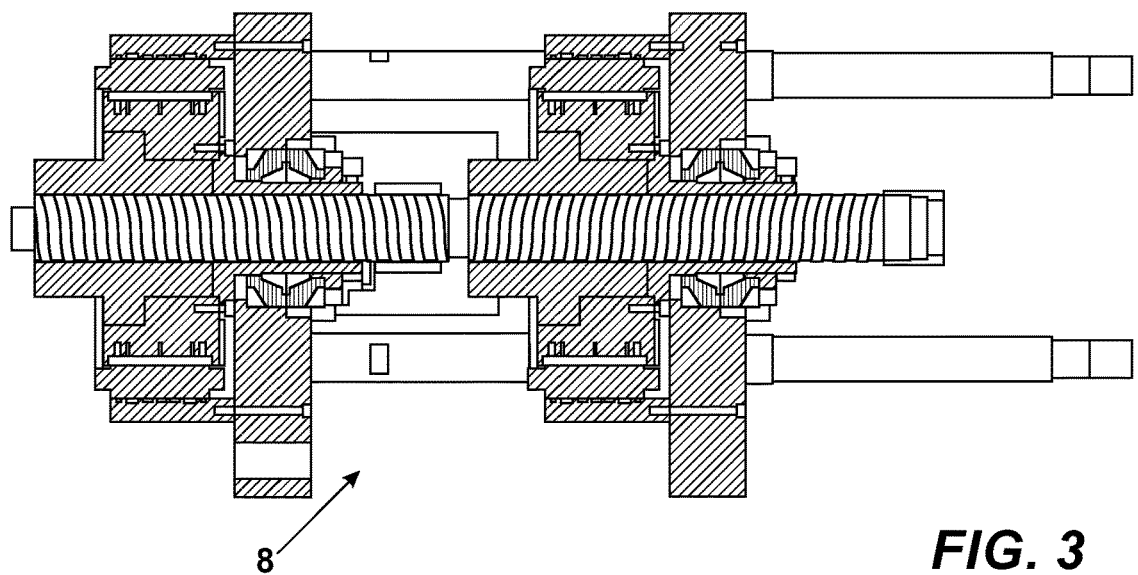
FIG. 3 shows a section of an electro-mechanical linear actuation device used in the deck landing system according to the present invention.

FIG. 3 represents a section of a typical linear actuator suitable to the purpose, equipped. The electric motor therewith it is equipped is of three-phase brushless type.

This actuator normally is actuated by the control electronic unit 9 providing for extending and checking the locking of the grippers 7, apart from the unlocking of the same and to the management of a device for recovering and releasing the kinetic energy 10 (KERS), preferably of the type acting with super-capacitors.

The control electronic unit 9 then has the purpose of driving said brushless motor by means of a driver installed inside thereof which can be easily modified to adapt it to the different needs of helicopters thereon it should have to be installed, being able to act on the electric parameters of the control ring of the motor itself.

Figure 2:
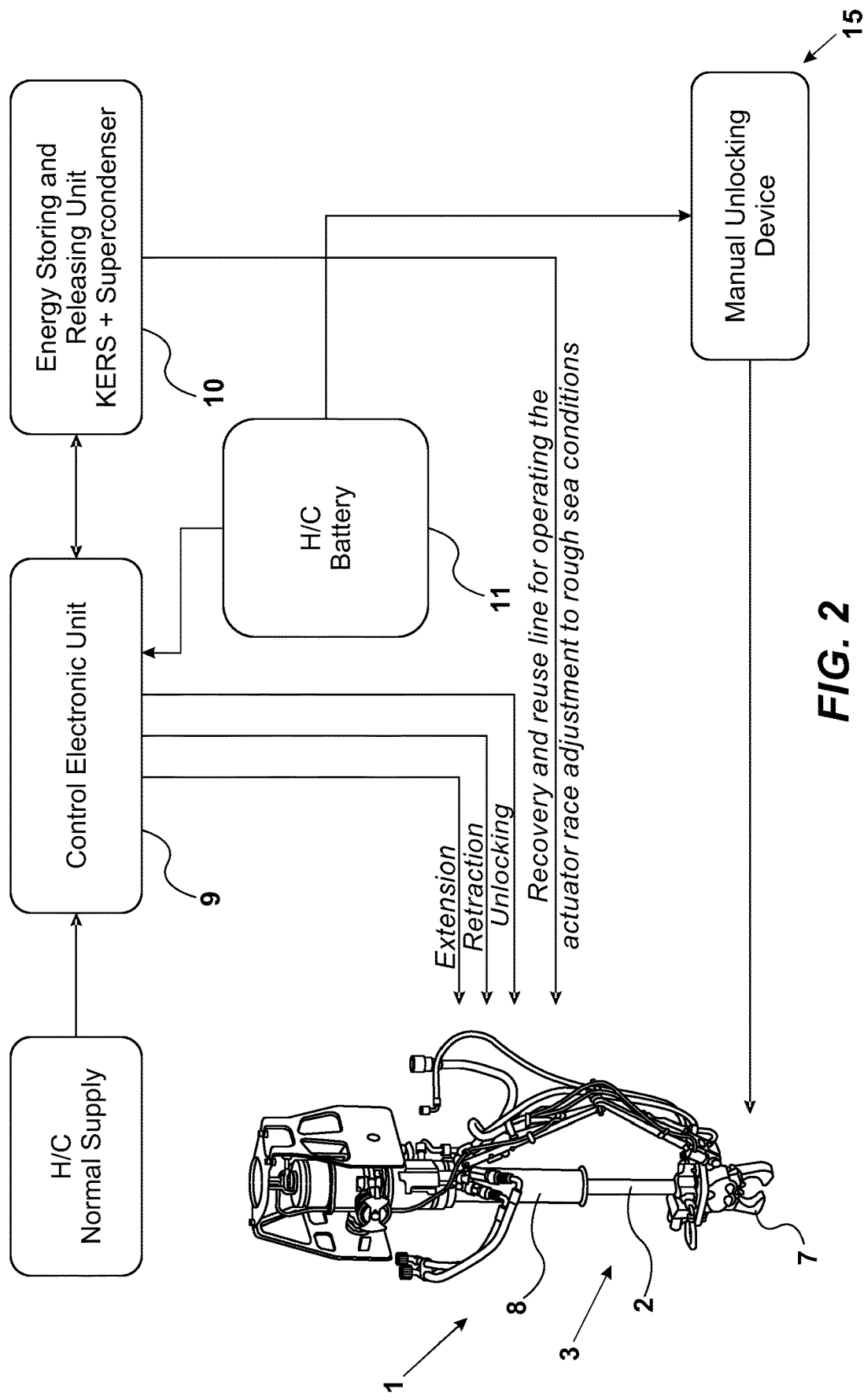
FIG. 2 shows a scheme illustrating a deck landing system according to the present invention.
Figure 4:
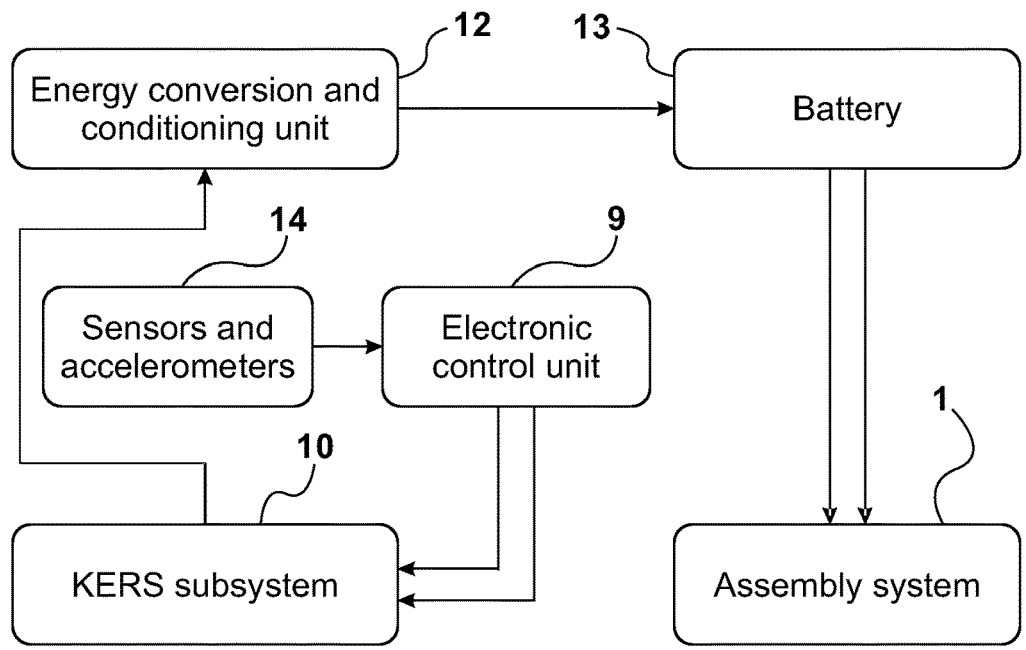
FIG. 4 shows a functional scheme of the deck landing system according to the present invention.

The control electronic unit 9 is interfaced with the device for recovering and releasing the kinetic energy 10 according to the principle scheme shown in FIGS. 2 and 4.

The device for recovering and releasing the kinetic energy 10, provided with super-condensers, accumulates and converts energy at high specific powers by providing it to the electro-mechanical actuator 8 for extending and retracting the deck landing system with the hooking grippers 7 connected to the grid plates of the ship, by guaranteeing that the helicopter is held to the deck under all conditions provided according to specification and of heavy sea in particular.

The capability of the super-condensers of being able to be loaded or discharged almost instantaneously with respect to the chemical accumulators guarantees a very high specific power necessary in the function of adjusting the actuator stroke to the conditions of «ship motion» of the ship and to the respective consequences on the helicopter when locked on the ship dock.

The device KERS (Kinetic Energy Recovery System) is used herein for recovering and returning the inertial energy deriving from the originated longitudinal motion of the boat generated by the wave motion (pitch) under the form of electric energy.

It is meant however that the linear actuator 8 is also connected to the supply system of the aircraft, which can actuate it under normal conditions.

Moreover, a battery 11 can be provided which can provide energy to a manual unlocking device 15, of electrical type too.

According to the scheme of FIG. 4, the device for recovering and releasing the kinetic energy 10 feeds a main battery 13 through a unit 12 for converting and conditioning the energy, and the battery 13, in turn, is connected to the actuator of the deck landing system.

The control unit 9 at last is equipped with sensors 14 which includes, for example, accelerometers.

Figure 5:
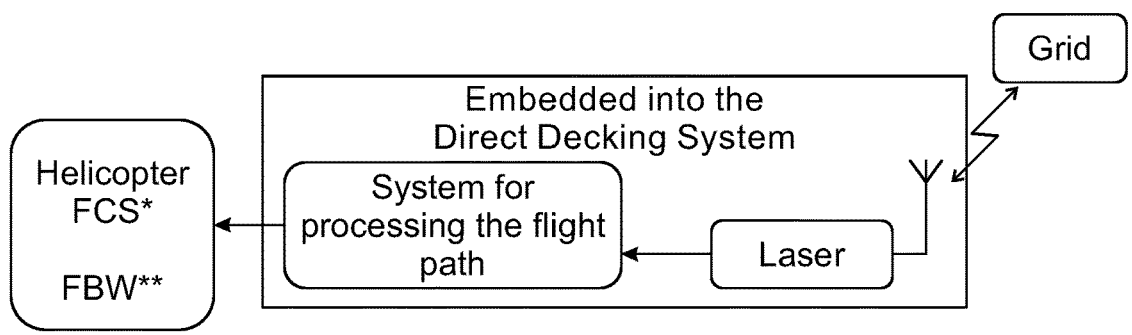
FIG. 5 shows an additional scheme of an accessory system connected to the deck landing system according to the present invention.

With reference to FIG. 5, an accessory system of the deck landing system is described hereinafter, allowing a manoeuvre of hooking a helicopter to the deck of a ship, or of a floating platform, equipped with suitable grid plates in compliance with standards of usual use in the field (STANAG 1276).

Such manoeuvre often results to be very difficult due to the particularly heavy conditions of the sea and poor visibility or night hours. The pilot often is obliged to several manoeuvres for approaching the ship and the grid place in particular before being able to reach the right place therefrom it is possible to actuate the deck landing system and secure the helicopter on the ship.

On this regard, the deck landing system comprises a tracking system capable of hooking the trajectory of the moving grid plate, expecting the motion thereof, guiding the helicopter and allowing the hooking of the helicopter itself to the grid plate in the easiest way through a system supporting the deck landing procedure under the conditions of poor visibility, night hours, and conditions of unfavourable sea based upon a tracking system of the grid plate which transforms the same in a precise "target-point" to be reached with the maximum precision.

The tracking system is of the laser-guiding type and it directs the laser beam to the centre of the locking grid plate on the ship.

When the helicopter is in proximity of the grid plate, at a sufficient distance to be able to receive the laser reflected energy, a laser sensor detects the direction and the distance of the moving points of the "target" and transmits the data to the system for processing the trajectory of the grid plate.

The system for processing the trajectory is constituted by the sensors receiving the information from the laser and a software having the task of processing the received data, by detecting the current trajectory of the grid plate in real time, estimating with great precision, thanks to dedicated algorithms, the dynamics of the grid plate and by calculating the trajectory which the helicopter will have to follow to hook to the ship deck with precision and without risks.

The electronic system for processing the trajectory then will provide the calculated data to the helicopter which could use them as input to an advanced navigation system supporting the automatic drive of the helicopter in the single manoeuvre of hooking to the grid plate of the ship even under unfavourable visibility and atmospheric conditions.

More in details, the data received from the electronic system for processing the trajectory are transformed by the same to make them available to the helicopter which will use them by means of an advanced navigation system supporting the automatic guide of the same, in the manoeuvres of deck landing to the ship.

The flight automatic system then has the task of guiding the helicopter through a defined path and to stabilize it, by controlling the asset and the speed even thanks to a GPS module which determines the reference orientation to pursue the wished path by performing the flight control manoeuvres of the helicopter by means of a Fly-By-Wire system to position it at the wished height, speed and position.

To what described above a person skilled in the art, with the purpose of satisfying additional and contingent needs, could introduce additional modifications and variants, all however within the protective scope of the present invention, as defined by the enclosed claims.

The invention claimed is:

1. A deck landing system for aircrafts, adapted to implement a hook between the aircraft and a deck of a ship or of a floating platform, the deck being equipped with a target grid plate, which comprises:

a telescopic actuator (1) with a harpoon (3) having, at a distal end thereof, hooking grippers (7); and a control unit (9) which actuates said telescopic actuator (1), wherein the telescopic actuator (1) comprises a linear electromechanical actuator (8) having:

a main battery (13), fed through an energy conversion and conditioning unit (12), and connected to said telescopic actuator (1); and a supercapacitor device (10), which recovers and releases kinetic energy generated by waves with the aircraft locked on said deck, and which feeds said main battery (13).

2. The deck landing system according to claim 1, further comprising an electric motor supplied by an auxiliary battery (15) of the aircraft, providing power to the grippers (7) of the telescopic actuator (1) to unlock the grippers from a closed position thereof.

3. The deck landing system according to claim 2, wherein said electric motor is a brushless electric motor.

4. The deck landing system according to claim 1, wherein the control unit (9) comprises sensors (14) which include accelerometers.

5. The deck landing system according to claim 1, wherein a tracking system is provided capable of hooking the grid plate.

6. The deck landing system according to claim 5, wherein the tracking system is a laser-guiding type, which directs a laser beam to the center of the grid plate on the ship.

* * * * *